(12) United States Patent
Ryan

(10) Patent No.: US 7,219,901 B2
(45) Date of Patent: May 22, 2007

(54) CUPHOLDER FOR MOUNTING ON BASKET OF SHOPPING CART

(75) Inventor: Mark T. Ryan, Haskell, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 11/252,937

(22) Filed: Oct. 18, 2005

(65) Prior Publication Data

US 2007/0085282 A1   Apr. 19, 2007

(51) Int. Cl.
*B62D 39/00* (2006.01)

(52) U.S. Cl. ............... 280/33.992; 280/DIG. 4; 224/926; 224/411

(58) Field of Classification Search ........... 280/33.992, 280/33.991, DIG. 4; 248/311.2, 312.1; 224/926, 224/411, 414, 425, 434
See application file for complete search history.

(56) References Cited

U.S. PATENT DOCUMENTS

| | | | | |
|---|---|---|---|---|
| 1,077,027 A | * | 10/1913 | Austin | .................... 248/315 |
| 2,601,571 A | * | 6/1952 | Sverkerson | ............... 211/74 |
| 2,763,413 A | * | 9/1956 | Felton | ..................... 224/411 |
| 2,995,333 A | * | 8/1961 | Pazzano | ................. 248/230.7 |
| 3,021,106 A | * | 2/1962 | Kramer | ................ 248/231.71 |
| 3,734,439 A | * | 5/1973 | Wintz | ................... 248/224.51 |
| 4,526,124 A | * | 7/1985 | Hartwall | ..................... 114/219 |
| 5,060,832 A | * | 10/1991 | Link | ........................ 224/414 |
| 5,494,306 A | | 2/1996 | Adamson et al. | |
| 5,938,091 A | | 8/1999 | Bergin et al. | |
| 6,186,382 B1 | | 2/2001 | Bergin et al. | |
| 6,644,524 B1 | | 11/2003 | Garvin | |
| 6,832,768 B2 | | 12/2004 | Duchene et al. | |

\* cited by examiner

*Primary Examiner*—Christopher P. Ellis
*Assistant Examiner*—John Walters
(74) *Attorney, Agent, or Firm*—Wood, Phillips, Katz, Clark & Mortimer

(57) ABSTRACT

A cupholder, which is mountable to a wall of a basket of a shopping cart, comprises a continuous wire having two lowermost portions, between and to which the outer mounting plate is mounted, two intermediate portions, which define a cup-supporting level and on which a cup-supporting plate is seated, and an uppermost portion, which is shaped to embrace a cup being held by the cupholder. The continuous wire has two lower connecting portions, each of which connects one of the lowermost portions to one of the intermediate portions, and two upper connecting portions, each of which connects one of the intermediate portions to the uppermost portion.

8 Claims, 1 Drawing Sheet

CUPHOLDER FOR MOUNTING ON BASKET OF SHOPPING CART

TECHNICAL FIELD OF THE INVENTION

This invention pertains to a cupholder, which is mountable to a wall of a basket of a shopping cart.

BACKGROUND OF THE INVENTION

As exemplified in prior patents including, among other patents, U.S. Pat. No. 5,494,306, No. 5,938,091, No. 6,186,382, No. 6,644,524, and No. 6,832,768, it has been known to provide handles, seat bases of child seats, and other components of shopping carts with cupholders, which shoppers can use to hold cups containing coffee, soft drinks, or other beverages.

SUMMARY OF THE INVENTION

This invention provides for a shopping cart having a basket, which has walls and which has an upper edge, a cupholder, which is mountable to one of the walls, via an outer mounting plate and an inner mounting plate. The cupholder comprises a continuous wire having two lowermost portions, at which the continuous wire terminates and between and to which the one of the outer and inner mounting plates is mounted, two intermediate portions, which define a cup-supporting level and which are arranged so as to extend over the upper edge of the basket when the cupholder is mounted to one of the side walls of the basket, via the mounting plates, and an uppermost portion, which is shaped so as to embrace a cup being held by the cupholder.

Preferably, the continuous wire has two lower connecting portions, each of which connects one of the lowermost portions to one of the intermediate portions, and two upper connecting portions, each of which connects one of the intermediate portions to the uppermost portion. Preferably, the cupholder comprises a cup-supporting plate, which is seated on the intermediate portions of the continuous wire.

BRIEF DESCRIPTION OF THE DRAWINGS

FIG. 6 is taken from the near side of the cupholder, as illustrated in FIG. 1, the far side being a mirror image of the near side.

DETAILED DESCRIPTION OF THE ILLUSTRATED EMBODIMENT

Figure 1:
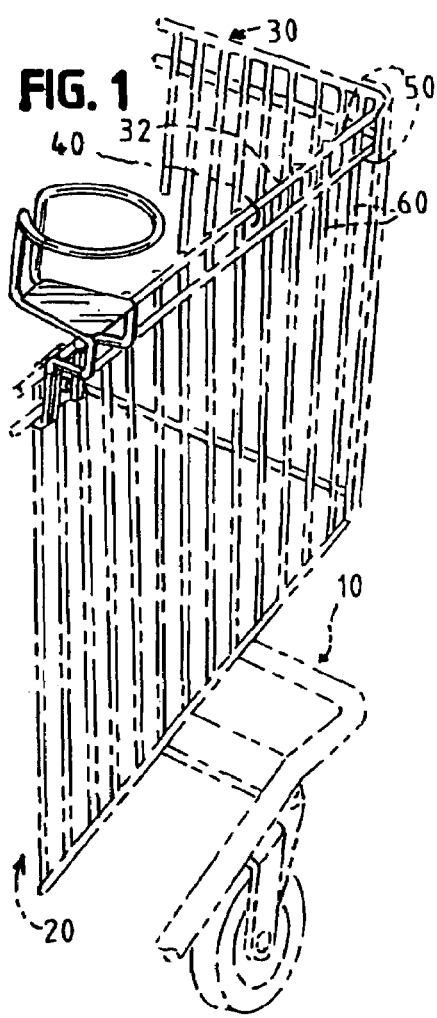
FIG. 1 is a perspective view of a cupholder and a mounting means, by which the cupholder is mounted to a wall of a basket of a shopping cart. The wall and other features of the shopping cart are illustrated, fragmentarily, in broken lines.
Figure 2:
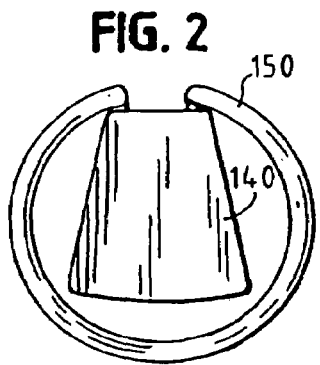
FIGS. 2, 3, 4, 5, and 6, on a larger scale, are, respectively, a top plan, a bottom plan, a front elevation, a rear elevation, and a side elevation of the cupholder and the mounting means.
Figure 3:
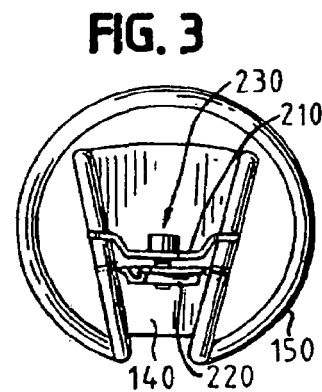
Figure 4:
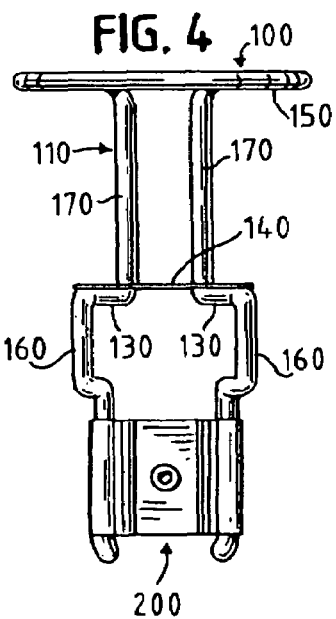
Figure 5:
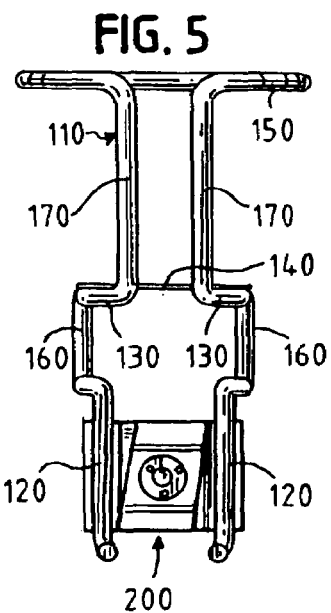
Figure 6:
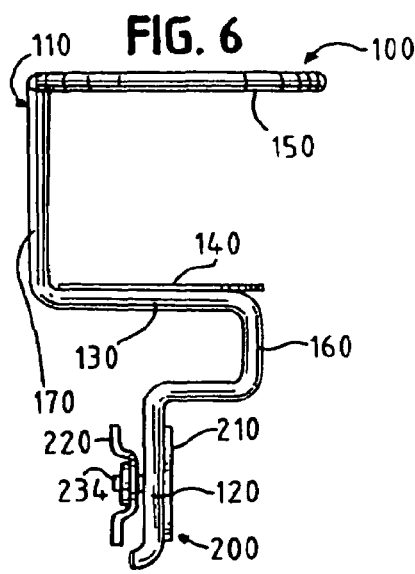

As illustrated in FIG. 1, a cupholder 100 is mounted to a shopping cart 10 by a mounting means 200, which is employed to mount the cupholder 100 to a side wall 20 of a basket 30 of the shopping cart 10. The basket 30 has an upper edge. The side wall 20 of the basket 30 of the shopping cart 10 has a pattern of substantially rectangular apertures 40, which are defined by substantially horizontally extending wires 50 and by substantially vertically extending wires 60.

The mounting means 200 comprises an outer mounting plate 210, which is positionable outside and against the side wall 20, at a given aperture 40, an inner mounting plate 220, which is positionable inside and against the side wall 20, at the same aperture 40, and a fastener 230, which has a head 232 and a threaded shank 234. The threaded shank 234 is adapted to extend through a hole 212 in the outer mounting plate 210, through the same aperture 40, into a threaded hole 222 in the inner mounting plate 220, for fastening the outer and inner mounting plates 210, 220, when so positioned, to each other, so as to mount the cupholder 200 to the side wall 20. Both of the outer and inner mounting plates 210, 220, are adapted to project, when so positioned, into the given aperture 40. Essentially, the inner mounting plate 220 functions as a threaded nut, which coacts with the threaded shank 234 of the fastener 230.

The cupholder 100 comprises a continuous wire 110 having two lowermost portions 120, which extend downwardly, at which the continuous wire 110 terminated, and between and to which the outer mounting plate 210 is welded or is mounted otherwise. Moreover, the continuous wire 110 has two intermediate portions 130, which extend horizontally, which define a cup-supporting level, and on which a cup-supporting plate 140 is seated, and an uppermost portion 150, which has a curved shape adapting the uppermost portion 150 to embrace a cup being held by the cupholder 100. Furthermore, the continuous wire 110 has two lower connecting portions 160, each of which connects one of the lowermost portions 120 to one of the intermediate portions 130, and two upper connecting portions 170, each of which connects one of the lowermost portions to the uppermost portion. The cup-supporting plate 140, which is an element of the cupholder 100, is welded or is mounted otherwise to the intermediate portions 130 of the continuous wire 110.

Figure 7:
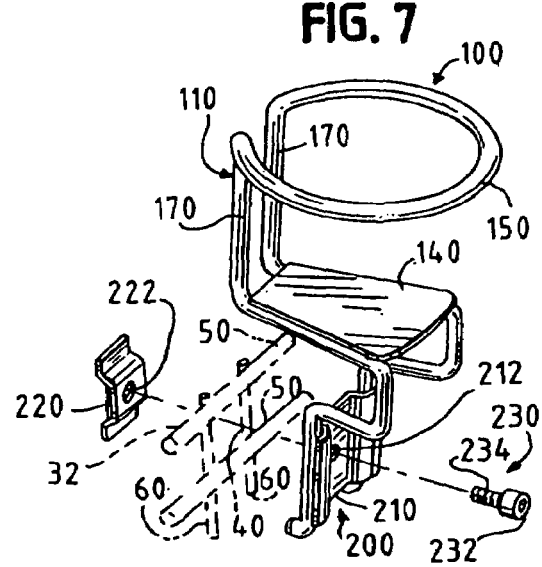
FIG. 7, on a similar scale, is a partly exploded, perspective view of the cupholder and the mounting means. A portion of the wall of the shopping cart is illustrated, fragmentarily, in broken lines.

As illustrated in FIGS. 1 and 7, the intermediate portions 130 having the cup-supporting plate 140 mounted thereon is arranged so as to extend over the upper edge 32 of the basket 30 when the cupholder 100 is mounted to the side wall 20 of the basket 30.

The invention claimed is:

1. For a shopping cart having a basket, which has walls and which has an upper edge, a cupholder, which is mountable to one of the walls, via an outer mounting plate and an inner mounting plate, wherein the cupholder comprises a continuous wire having two lowermost portions, at which the continuous wire terminates and between and to which the one of the outer and inner mounting plates is mounted, two intermediate portions, which define a cup-supporting level and which are arranged so as to extend over and across the upper edge of the basket when the cupholder is mounted to one of the walls, via the mounting plates, and an uppermost portion, which is shaped so as to embrace a cup being held by the cupholder, wherein each lowermost portion is connected to an associated one of the intermediate portions so as to position one end of the associated on of the intermediate portion above the basket and the other end thereof away from the basket.

2. The cupholder of claim 1, wherein the continuous wire has two lower connecting portions, each of which connects one of the lowermost portions to one of the intermediate portions, and two upper connecting portions, each of which connects one of the intermediate portions to the uppermost portion.

3. The cupholder of claim 1, wherein the cupholder comprises a cup-supporting plate, which is seated on the intermediate portions of the continuous wire.

4. The cupholder of claim 2, wherein the cupholder comprises a cup-supporting plate, which is seated on the intermediate portions of the continuous wire.

5. The cupholder of claim 1, wherein the cupholder comprises a continuous wire having two lowermost portions, at which the continuous wire terminates and between and to which the outer mounting plate is mounted, two intermediate portions, which define a cup-supporting level, and an uppermost portion, which is shaped so as to embrace a cup being held by the cupholder.

6. The cupholder of claim 5, wherein the continuous wire has two lower connecting portions, each of which connects one of the lowermost portions to one of the intermediate portions, and two upper connecting portions, each of which connects one of the intermediate portions to the uppermost portion.

7. The cupholder of claim 5, wherein the cupholder comprises a cup-supporting plate, which is seated on the intermediate portions of the continuous wire.

8. The cupholder of claim 6, wherein the cupholder comprises a cup-supporting plate, which is seated on the intermediate portions of the continuous wire.

* * * * *